United States Patent [19]
Enrique Munoz Elizondo

[11] Patent Number: 5,365,061
[45] Date of Patent: Nov. 15, 1994

[54] OPTICAL DEVICE AND DATA COLLECTION SYSTEM

[76] Inventor: Carlos Enrique Munoz Elizondo, Chacara Nossa Senhora de Lourdes, S/No, Caixa Postal 379-Ribeirao Preto-Sao Paulo, Brazil

[21] Appl. No.: 958,979

[22] Filed: Oct. 9, 1992

[30] Foreign Application Priority Data

Mar. 12, 1992 [BR] Brazil ................................ 9200863

[51] Int. Cl.$^5$ ............................................. H01J 3/14
[52] U.S. Cl. ................................. 250/237 R; 250/239
[58] Field of Search ............... 250/226, 239, 237 R, 250/216

[56] References Cited

U.S. PATENT DOCUMENTS 4,988,885  1/1991  Lindstrom ............................ 250/560

Primary Examiner—David C. Nelms
Attorney, Agent, or Firm—Skjerven, Morrill, MacPherson, Franklin & Friel

[57] ABSTRACT

The present invention refer to an optical device and data collecting system, more specifically to a system for collecting and analyzing the response of optical sensors, which use may be extended to a large number of devices and equipments with the purpose of analyzing objects in accordance with light reflected or generated thereby. The invention distinguishes from the prior art by having an extremely simple configuration which allows for the determination of specific features such as size, shape, color and speed among others, thus replacing conventional systems which, besides being expensive and complex, do not provide for a large assortment of information and are susceptible to errors and changes in view of environmental conditions.

22 Claims, 11 Drawing Sheets $V_i$ = current reading
S = total of readings
D = minimum value of $V_i$ to be considered
$N_1$ = number of readings bigger than D
C = number of readings to control amplification
N = total number of readings
P = amplification value to be reached

OPTICAL DEVICE AND DATA COLLECTION SYSTEM

FIELD OF THE INVENTION

The present invention refers to an optical device and data collecting system, more specifically, to a system for collecting and analyzing the response of optical sensors, which may be used in a wide variety of devices and equipments, for the purpose of analyzing objects in accordance with the light reflected or generated thereby.

BACKGROUND

The present invention distinguishes from the prior art mainly by incorporating an extremely simple configuration that determines specific features such as size, shape, color and speed, among others, and replaces conventional systems which, besides being expensive and complex, do not provide for a large assortment of information and are susceptible to errors and changes in view of the environmental conditions, such as temperature, dust and the like.

The optical systems used for collecting data from several objects, which usually incorporate sophisticated optical devices such as lenses, optical fiber parts, prisms, and mirrors are well known.

In addition to their complexity, which hinders the best performance of such optical devices, attention should be paid to the behavior of a number of such optical sensors which change their response according to time and temperature, thus bringing about misadjustments in measuring systems.

Still with reference to the conventional systems, it should be pointed out that some of them convert DC signals into AC signals in order to analyze objects. However, at the time DC level is eliminated, too much noise is incorporated and the signal is distorted mainly when the signals occur at very short time intervals or the objects are very big.

The optical device and data collecting system according to the present invention avoids all the above cited inconveniences of the state of the art and may be used with great accuracy in devices that separate parts according to the color, size and shape thereof; in processes for controlling the quality of parts in bulk; in systems for controlling the production of continuous articles (textiles, wires, cables and the like); in processes for controlling pollution; in the continuous control of the density of fluids; in biological analyzers; in the control of fluids; in colorimeters, temperature meters and the like.

Generally, the objects being analyzed may be part made of different materials (metals, plastics, minerals); grains and seeds (coffee, peanuts, soy-bean, corn, bean, rice, almonds); smooth articles such as paper, vegetable leaves; fruit in general; articles for industrial or pharmaceutical use; continuously manufactured products; fluids and many others.

In general, the system is comprised of a light-responsive element, a system for lighting the focused object, a groove for restricting and/or regulating the incoming light, an electronic amplification system, an electronic digitation system, a microprocessor and a program for processing incoming information, as well as internal and external devices for the storage, control, alarm, rejection, positioning, count and transfer of data.

In practical terms, the application of the collecting and analyzing system in the device of the present invention comprises the pick-up by an optical sensor matching the wave length of electromagnetic waves reflected or emitted by the observed object. In the most common instance, the optical sensor may be a photocell, a photodiode, a photoresistor, a photomultiplier or a phototransistor. The response of the optical sensor is turned into a voltage response by means of a suitable converting circuit and amplifier.

As stated above, if required, a light source lights the object to be analyzed and there might be a change in the lighting angle as well as in the type of wave used, to be exemplified below.

The signal generated by the sensor is amplified and digitized so that a software program may analyze the signals and get the required information, based on which different means such as those below may be activated; alarm, rejection, positioning, transfer of data, printing, marking, activation or deactivation of equipment and others.

In a more comprehensive aspect, it should be appreciated that the invention is provided with data input devices for changing the functions and criteria used in the operation of the system; also, the device is able to communicate with other computerized systems such as personal computers and the like.

In its preferred physical embodiment, the invention comprises a small case provided with display and keyboard to which are connected signal and electric power source cables that connect the sensors (one or more).

Technically, it is known that optical sensors have two components, viz: own noise or dark current (electric current which flows whenever the sensor is in the dark), and response to the light received by the sensor.

The new system proposed in the present invention converts and amplifies into a voltage signal the sensor response by means of a proper circuit, this direct current signal being processed by special circuits in such a way that inconveniences brought about by sensors, such as temporary misadjustments or in view of environmental conditions, may be eliminated.

Another feature of the present system is that it may be used whether there is or not a relative movement between the object being analyzed and the optical sensor. The relative movement may be of the linear or circular type, or a combination of both.

The sensor may be fixed, in which case the object performs a linear movement over a conveyor belt, or falls freely; there may also be a combination of linear and rotatory movements when the sensor performs a reciprocating movement reaching a larger area; in the event the circular movement is combined with the linear movement, the sensor being within a tube at a set speed, the area under observation comprises an helix.

BRIEF DESCRIPTION OF THE DRAWINGS

The invention is shown below in greater details and, for the sake of a better understanding, reference should be made to the appended drawings, wherein.

DESCRIPTION OF THE PREFERRED EMBODIMENTS

Figure 3:
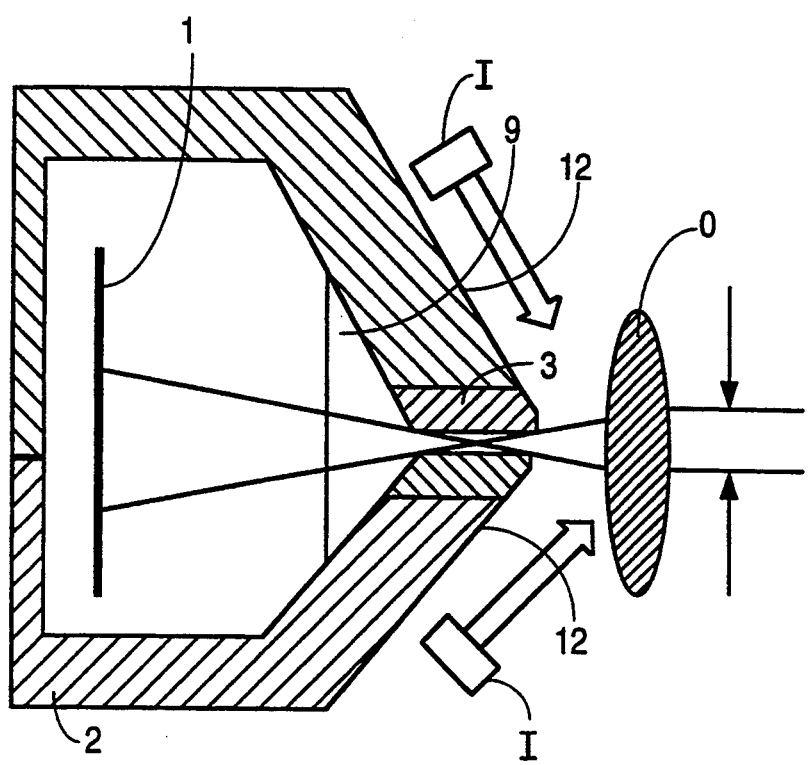
FIG. 3 shows the basic construction of the optical sensor applied to the object being analyzed.
Figure 4:
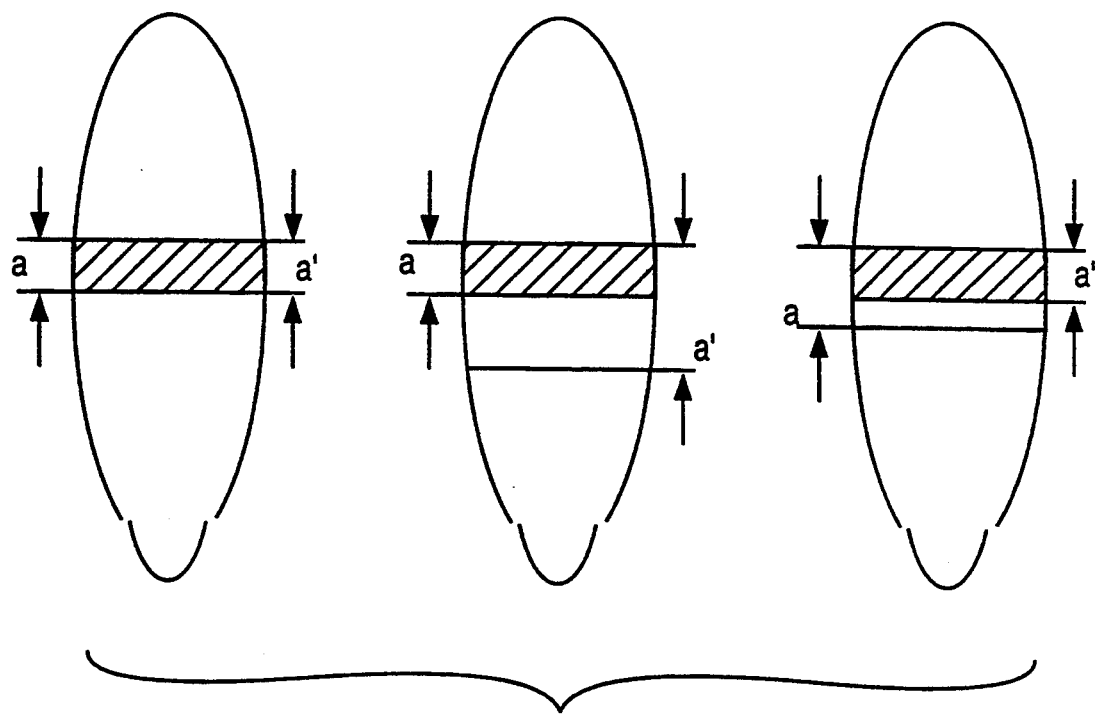
FIG. 4 shows a sequence of different types of reading.

The optical device and data collecting system according to the present invention comprises, with respect to the device of FIG. 3, an optical sensor 1 housed within a housing 2 the front portion 12 of which is provided with a groove 3 for the passage of the light reflected from an object 0 under observation. The object may be lighted by means of a lighting system I. The aperture of groove 3, as shown in FIG. 4, is one of the factors that determine the area under observation.

Figure 17:
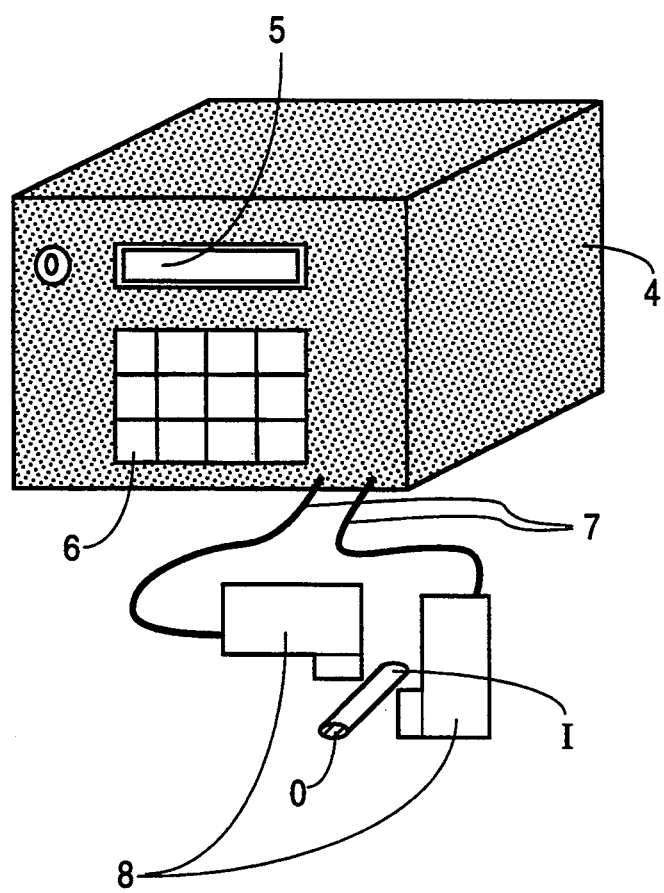
FIG. 17 shows the device having two stand-alone sensors, using external lighting.

As shown in FIG. 17 the physical embodiment of the invention may comprise, for instance, a case 4 having a suitable shape, the front portion of which is provided with a display 5 and keyboard 6. Case 4 is connected by signal and electric power source cables 7 to sensors 8, in this case two sensors shown in FIG. 17.

Groove 3 (FIG. 3) is designed in order to restrict and/or to regulate the incoming light. The device according to the present invention is also provided with an electronic amplification system, an electronic digitation system, a microprocessor and a program for processing incoming information, as well as internal and external devices for the storage, control, alarm, rejection, positioning, count and transfer of data.

Figure 5:
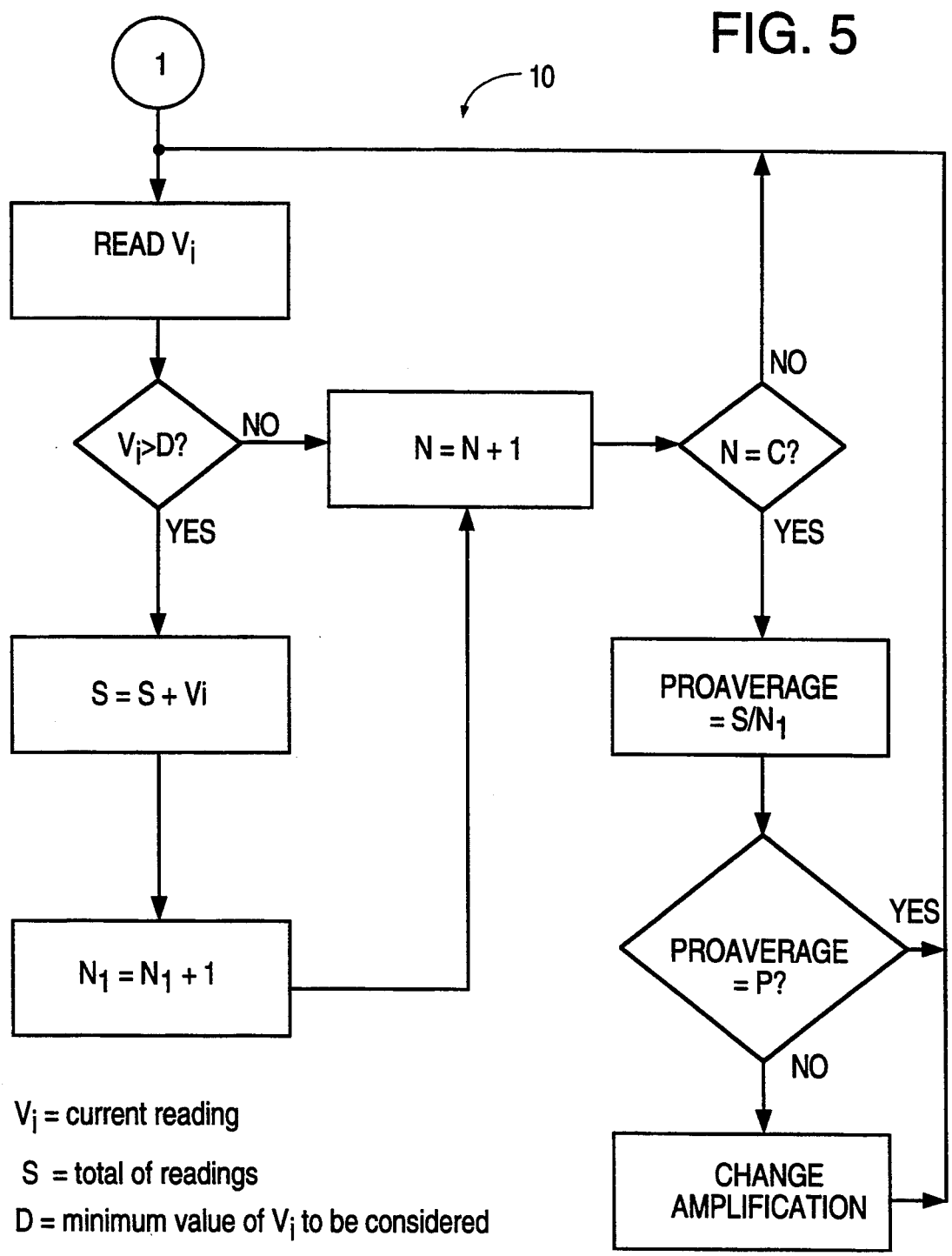
FIG. 5 shows the block diagram of a software program for calculating the integration of the signal.

Generally speaking, sensor 1 generates a signal which is converted and amplified into a voltage signal which is then digitized so that the software program (FIG. 5) may analyze the signal in order to get the required information. The program may use the signal to produce a curve of the response of the optical sensor to the relative motion of an object.

Figure 12:
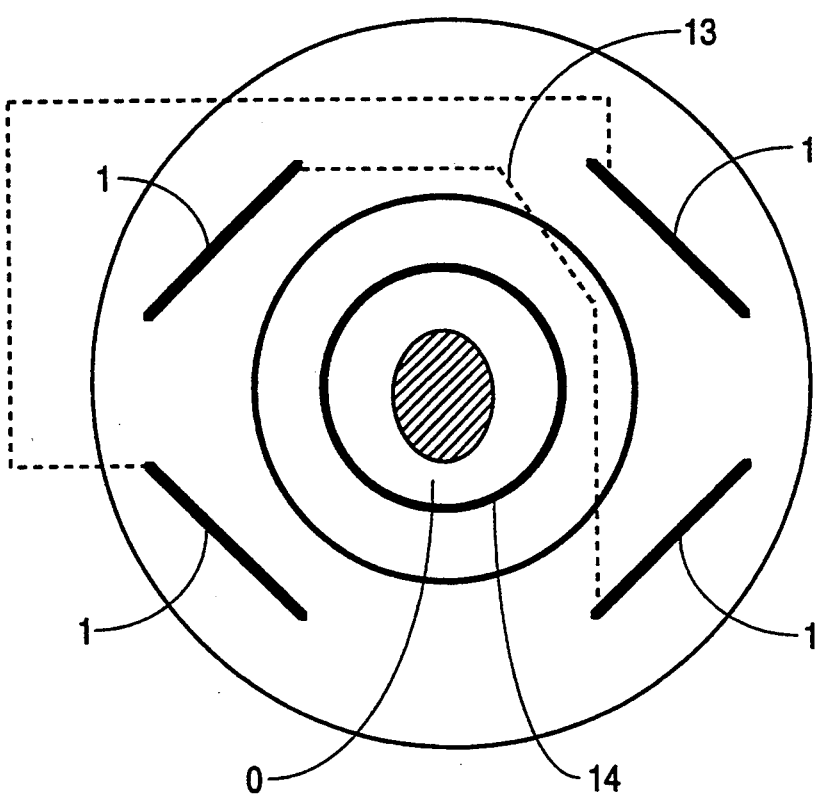
FIG. 12 is a view illustrating several sensors around the object being analyzed, suitable for color reading throughout its surface.
Figure 13:
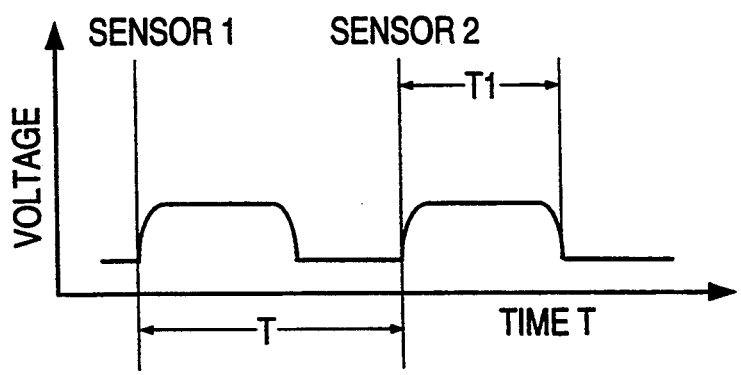
FIG. 13 is a graphic showing the Voltage versus Time curve for two distinct sensors.

The optical sensors may be inserted individually, i.e., one for each housing, or several of them may be conveniently distributed as shown in FIG. 12.

Groove 3 may be of the circular, oblong or straight type according to the use of the device, however a proper relationship between the lighted area and the aperture of groove 3 should be adopted in order to get a high ratio between signal and noise. If there is need for external lighting, this is attained by means of a system coupled to the device, which lighting system I should be placed as close as possible to the object(s) to be analyzed. A thin transparent element 9 is placed between said groove 3 and said sensor 1 in order to avoid penetration of dust or strange objects, while an optical filter should be placed at the same position whenever required.

Figure 1:
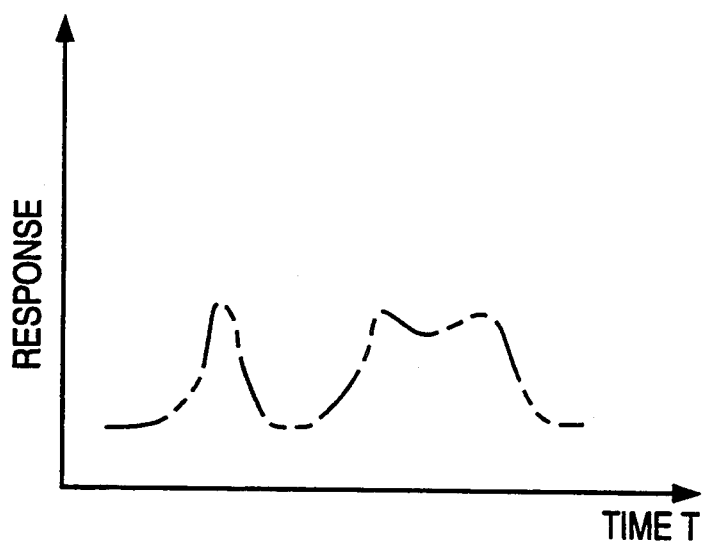
FIG. 1 shows a characteristic curve of the optical sensor in response to the relative movement of an object being lighted.

FIG. 1 shows a characteristic curve of the response of the optical sensor to the relative motion of a lighted object 0. By analyzing this response it is possible to determine, as shown below, features of the objects 0 being analyzed, such as: color, size, shape and speed. In a manner analogous to the one described herein, the light generated by an object (0) produces a curve similar to that of FIG. 1. The basic characteristic of the system in question is to read at regular intervals the values of the above mentioned curve. This means that, at constant and pre-set intervals, voltages are read, which can be done by an analog/digital converter. The digitized signal is then processed, so that the values read from FIG. 1 result in a curve similar to that of FIG. 2.

Figure 2:
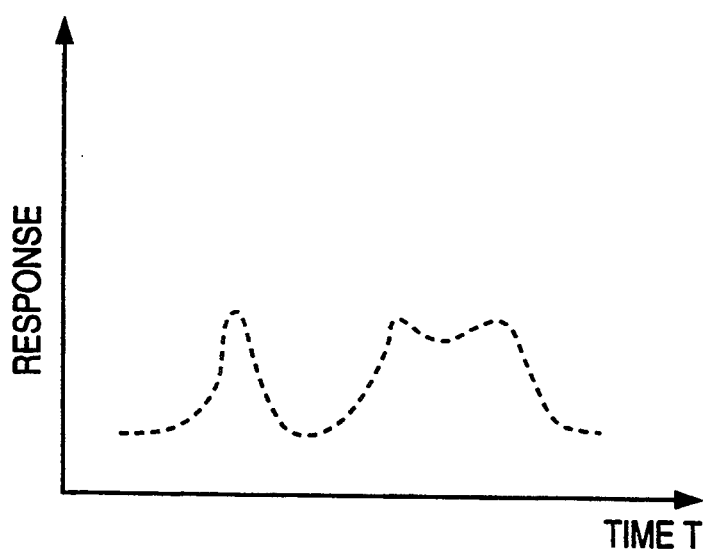
FIG. 2 shows FIG. 1 after the values have been digitized at equal time intervals.

A new and extremely important feature of the present invention is the fact that analysis of the response of sensor 1 (FIG. 1) plus utilization of the reading procedure shown in FIG. 2 provide the system with an assortment of new information, because features concerned with the object itself may be deduced and calculated from analysis of the data.

With relation to the timed measurements, the measurements are periodic and may vary. For example, any period between 2 microseconds, and 100 microseconds would suffice for most applications.

With regard to such parameters as the aperture of groove 3, the relative speed of object 0 and the interval between readings, there may be three different situations, viz: the observed area (a) is equal to the average (proaverage) lighted area (a'); the observed area (a) is smaller than the lighted area (a'); the observed area (a) is larger than the lighted area (a') (FIG. 4); however, the lighted area is partially observed many times.

Still with regard to the application, it is important to carry out measurements in the whole surface of the object (0) in order to find discontinuities, and a small aperture groove 3 should be used to attain a more accurate measurement.

By controlling the frequency of readings and the amplification system, the system allows for the optimization of the reading quality, and it may be possible to choose the types of reading, as shown in FIG. 4, and the most appropriate reading for a given application, so that the control of the signal amplification compensates for any change in either the lighting or the optical sensors (1).

The system employs the calculation of the integration of the signal by means of a software program 10 wherein the above-mentioned integration of the signal is calculated as the sum of discrete values of every reading, which values occur at regular intervals. The parameter for the amplification adjustment is calculated by integrating during a pre-set time period and comparing with a standard measurement stored in memory. Such a function can be seen in the software program shown in FIG. 5.

The value obtained in the integration is the fundamental parameter required for carrying out signal automatic adjustment procedures, as well as those related to the analysis of size, color and shape. The integration value should remain stable during the analysis process, and modifications should be made by means of amplification or attenuation circuits as shown by device C in FIG. 14.

Figure 6:
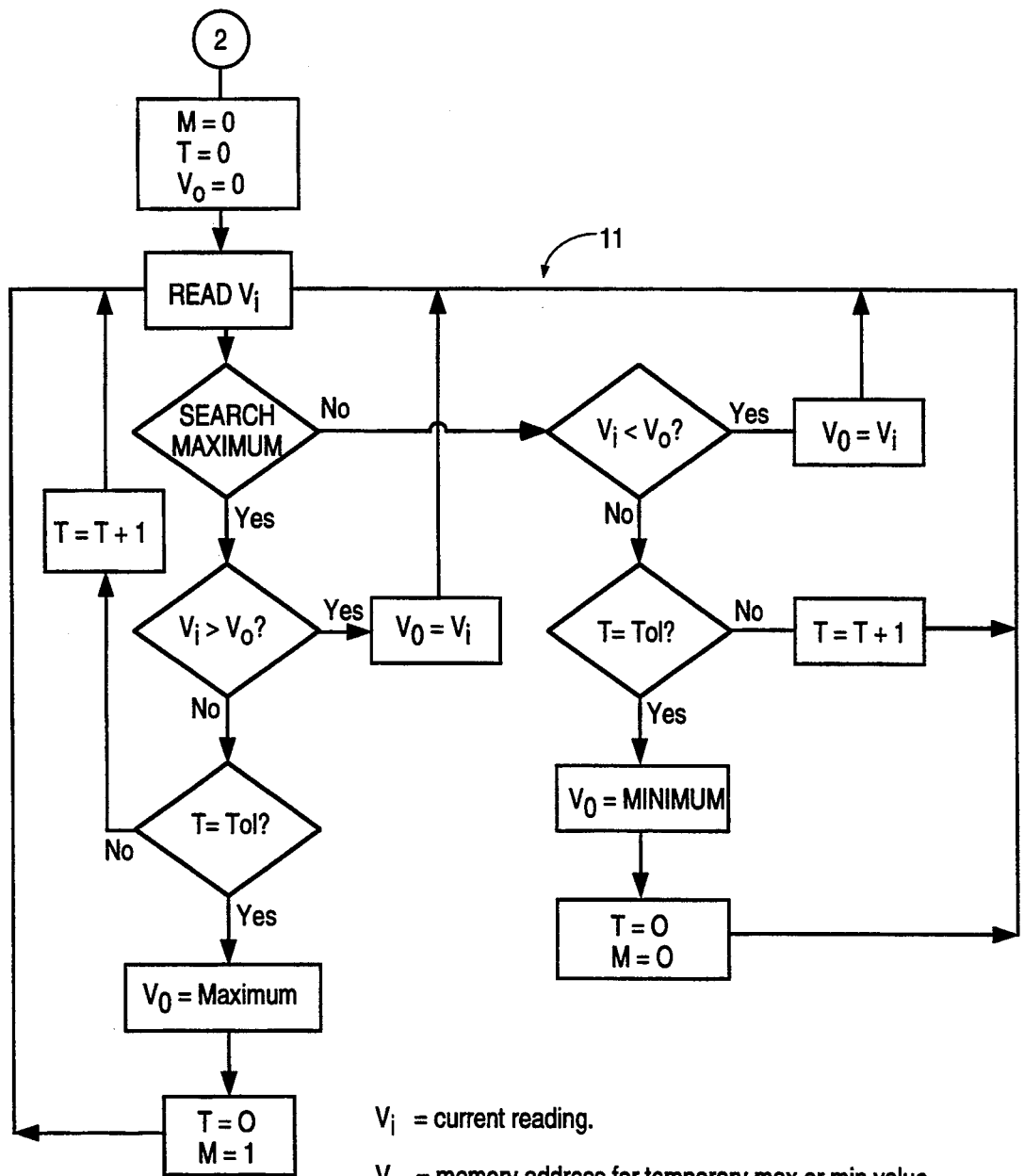
FIG. 6 shows the block diagram of a software program for analyzing maximum and minimum values.
Figure 7:
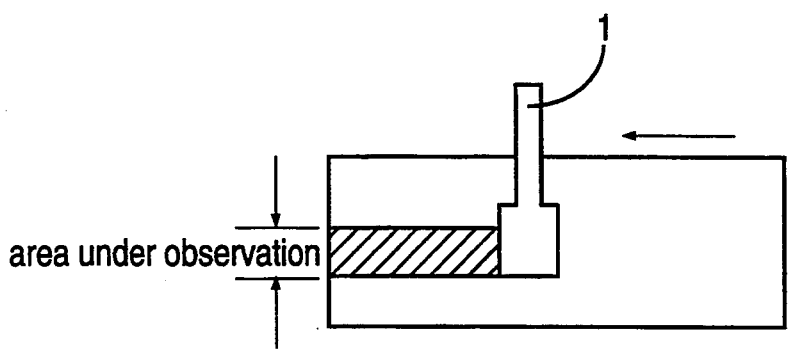
FIG. 7 is a drawing illustrating a fixed sensor where the area under observation is defined.
Figure 8:
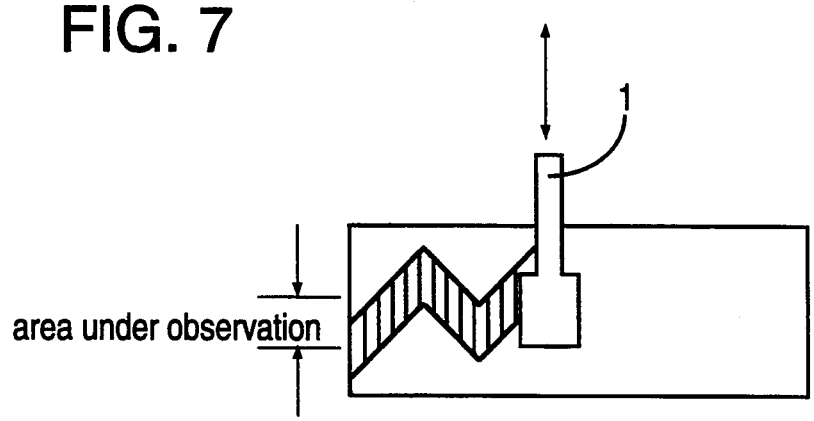
FIG. 8 is a drawing illustrating a mobile sensor where the area under observation is defined.
Figure 9:
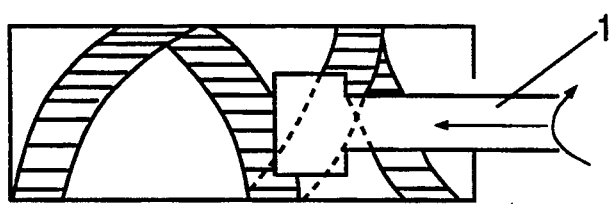
FIG. 9 is a drawing illustrating a sensor having a combination of linear and rotatory movements.
Figure 10:
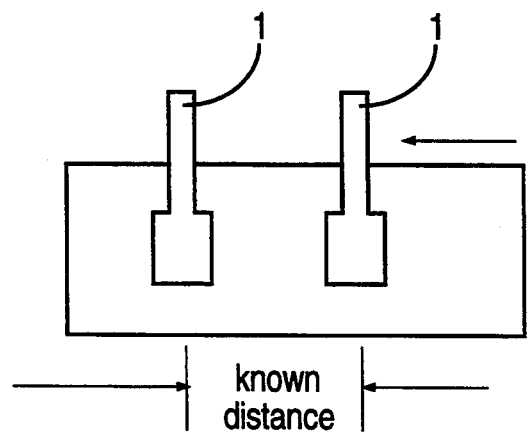
FIG. 10 is a drawing illustrating two sensors at a known distance.

The analysis of maximum and minimum values is quite important for it determines, in the case of discrete objects, whether it is the beginning or the end thereof, thus avoiding eventual doubts and it also informs if there have been sudden changes in the response of optical sensor 1. The determination of maximum and minimum values is accomplished by a software program 11 wherein the present values are compared with the previous ones (FIG. 6).

The system in question also allows for the simultaneous utilization of one or more sensors 1, thus facilitating the analysis of several factors at the same time, providing an innovating and rather important recourse. Thus, it is an extremely versatile system, for it makes it possible to place sensors 1 in different planes and analyze, for instance, the object 0 as to its shape, color, speed and size, these operations being carried out simultaneously; these characteristics may be determined in different ways, but always employing the same procedure and elements described in the present invention.

Figure 11:
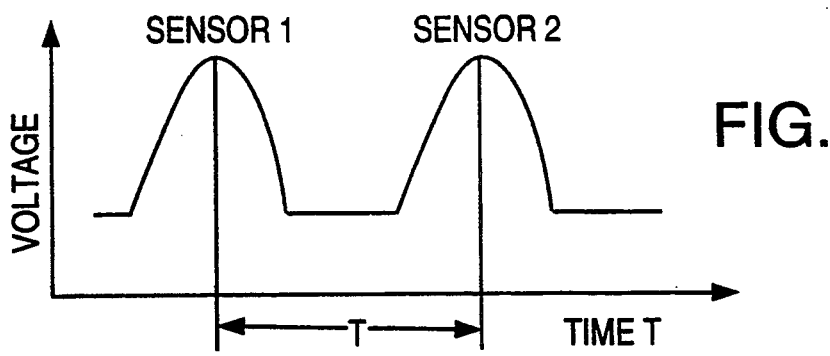
FIG. 11 is a graphic showing the Voltage versus Time curve.

Depending on the desired application, different sets based on the same device may be arranged, and the difference between objects is determined by differences in the number of sensors 1, the type of optical chamber, the position of sensors with relation to the object 0 under observation, the utilization of optical filters or not, and the use of distinct lighting systems. In order to determine the different properties of the objects, the following configurations should be employed:

To determine the speed of an object 0:
  in case the size of the object is known: by using a sensor the time between the beginning and the end of the passage of the object should be determined. FIG. 11 illustrates this situation;
  in case the size of the object is not known: by using two identical sensors placed at a known distance from each other, the time between the beginning or end of two signals should be measured.

To determine the color according to the parameters to be analyzed, the sequence below should be followed:
  in case a particular color is required: in this event, a sensor (1) having an optical filter should be provided, since the response of the sensor outside the required range is too little;
  in case a range of colors is required: two or more sensors (1) showing characteristic curves different from the response to the wave length should be used.

As described above, the difference in the sensor response values supplies the color of object 0. Depending on the application of the device, and in clean environments, the system amplification adjustment may be promoted by using standard colors and subsequently keeping amplification at a constant value. It is also possible to employ the average color of the objects as a reference.

In cases where the objects 0 are to be analyzed as to their color on the whole surface and not only on one side, the optical chamber includes several sensors 1 connected in parallel and placed around the object 0 under analysis. FIG. 12 illustrates this configuration as stated above.

Still with reference to FIG. 12, between the sensors 1 and the object 0 under observation there is a thin glass 13, eventually an optical filter, and the ring-shaped groove 14. Thus, the incoming light is the average light in all directions for otherwise any change in the position related to the sensors would bring about a corresponding change in the amount of reflected light.

Figure 16:
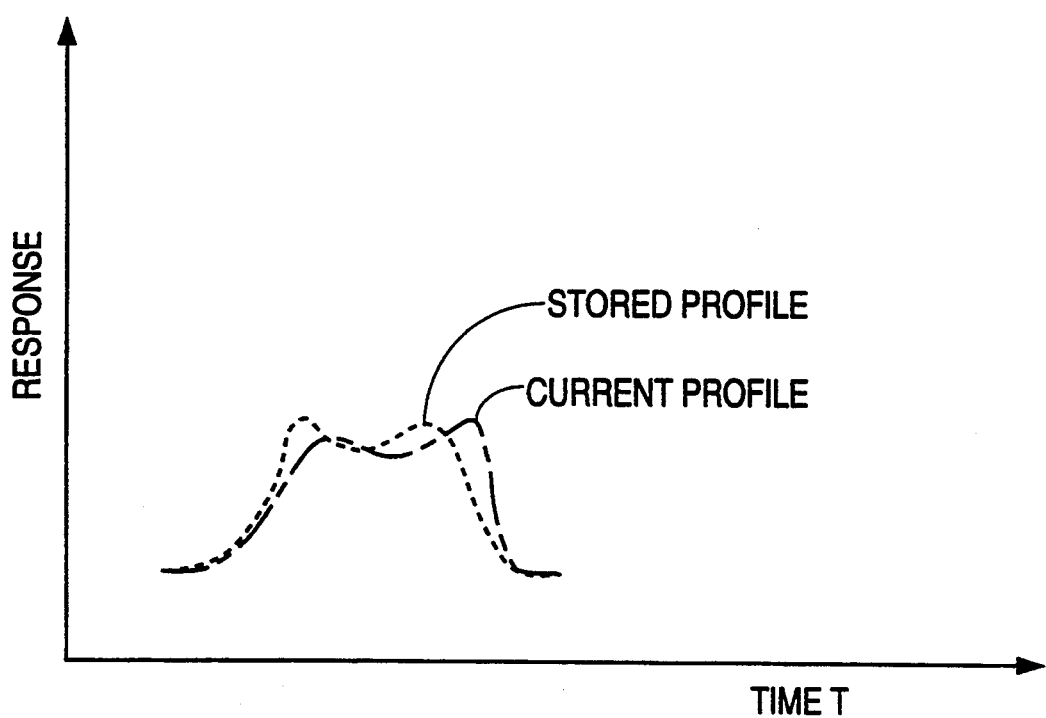
FIG. 16 is a Response versus Time curve showing the storage of responses for comparing incoming signals stepwise.

As to the determination of the shape, it should be appreciated that the light reflected by the object 0 depends on the reflective area and the characteristics and color of the surface. The stepwise comparison of every measurement to a standard value stored in the memory allows for the determination of complex objects, as shown in FIG. 16.

Two sensors placed at a set distance are used to determine the size of the object, and its speed should also be determined. After this is done, its length is determined by measuring the time during which the image of object 0 passes through the optical chamber. The stipulation of the maximum value supplies the measure of the other dimension which is perpendicular to the movement direction.

Figure 14:
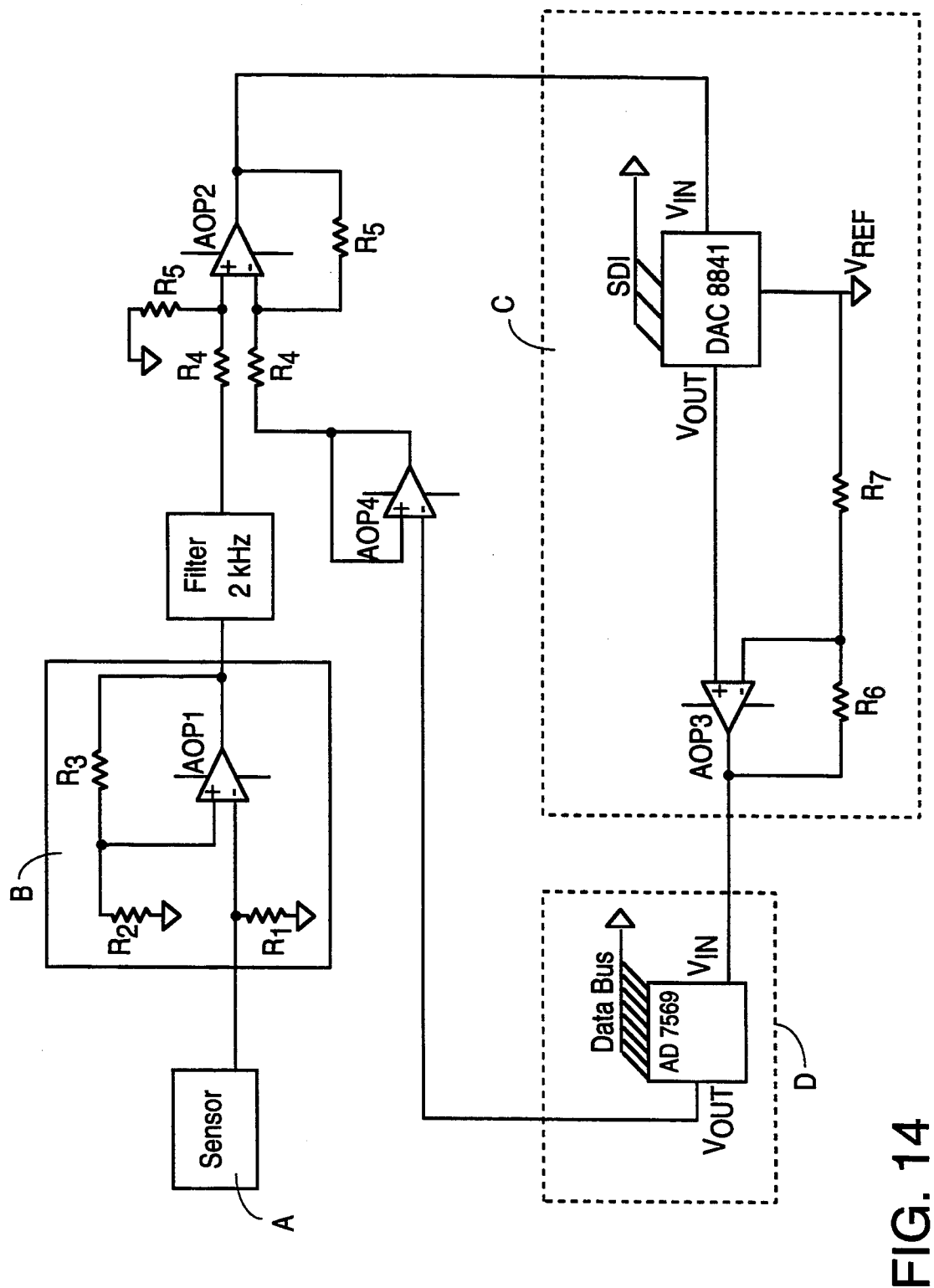
FIG. 14 shows an electroelectronic diagram.

FIG. 14 shows the system's electronic diagram, wherein point "A" is the input of one of the sensors 1, it being possible to simultaneously operate up to eight sensors since there is no restriction for the increase of such amount.

The signals may be amplified according to the need by means of device B, and the signals are immediately filtered assuming values above 2 KHz. The signals are digitized through device D and the data is transferred to the microcontroller which then analyzes same as required. The same microcontroller directs the sequence of readings for every sensor 1, thus enabling every port of device D. According to the results from the data analysis, it is possible to make signal amplification adjustments by means of signal amplification control device C referred to in FIG. 14, as well as adjustments in the software program of FIG. 5. Signal amplification adjustments may compensate for changes in the lighting and in optical sensors.

Device C also adjusts at periodic intervals for temporary changes in optical sensors by means of a subtraction circuit which operates through amplifiers AOP 4 and AOP 2. Thus, the DC level from optical sensors is eliminated or set at a convenient value according to the application.

Figure 15:
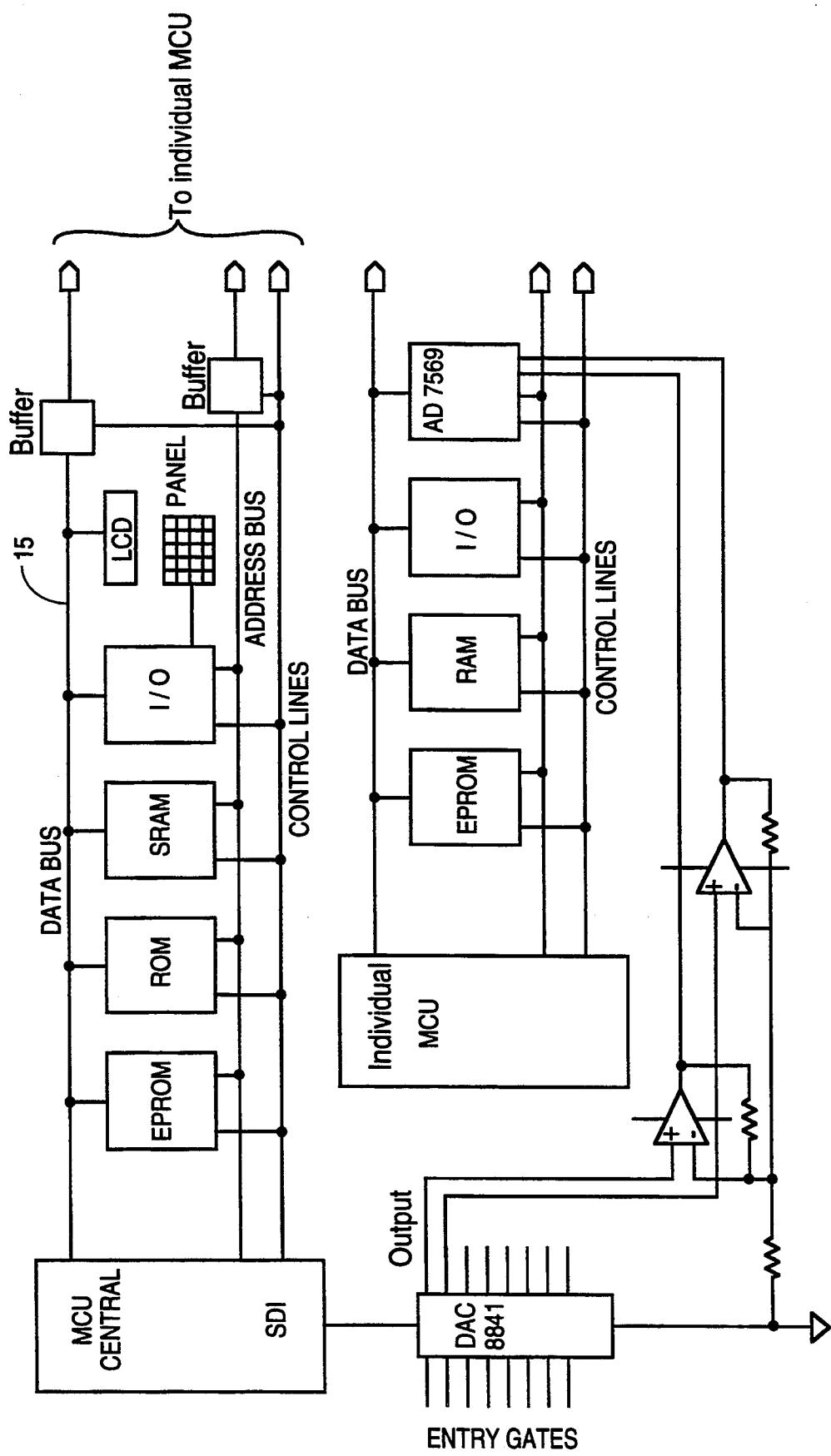
FIG. 15 shows an electronic diagram using the central microcontroller which controls external input and output devices as well as alarm and control devices.

For applications where it is necessary to read several different and independent devices, many data input and output devices should be controlled. For such, FIG. 15 shows the electronic diagram 15 wherein a central microcontroller MCU controls external input and output devices (display, keyboard, serial port, etc.), as well as alarm and control elements.

The central microcontroller MCU is connected to the other individual microcontrollers MCUs via bidirectional ports, for transferring data between memory devices. Every individual microcontroller MCU is responsible for the reading and rejection of analyzed values; whereas the central microcontroller MCU controls the amplification or attenuation value as required, the general input and output devices, as well as those which transfer data to other computerized devices.

The system also comprises the possibility to store in one memory the desired or undesired response of a given object, and the stepwise comparison of incoming signals, as shown in FIG. 16. By storing signals of complex parts it is possible to recognize said parts, since the system has excellent repeatability.

The light sources may be continuous, i.e., zero frequency, or any low frequency source, so that in this case it is enough to synchronize the measurements with the frequency thereof. In case of large parts, it is possible to use low frequency light, for instance, 60 Hz or lower.

Briefly, the described system brings about the possibility of using all kinds of optical sensors, for its quite simple assemblage in optical chambers makes its application very easy. The possibility of not using intermediate optical devices allows a reduction in the optical chamber size and, therefore, a reduction in manufacturing costs, as shown in FIG. 3.

In the above mentioned figure, the lighting system I may be coupled to the external portion of the housing 2 of the optical sensor 1, which system may be a light source such as a light emitting diode (LED), incandescent lamp, or the light may be conducted through optical fiber from a light source.

I claim:

1. An optical device for collecting data relating to an object, said object illuminated by an external lighting system adjacent said object, said optical device comprising:
   a housing forming an optical chamber, said housing having a front portion, said front portion having a groove such that said front portion restricts and/or regulates entry of light using an edge of said groove, said light being reflected from an area of said object into said optical chamber, said groove of said front portion having a configuration selected from the group consisting of a ring shape, an oblong shape and a straight shape;
   an optical sensor mounted inside said optical chamber, said optical sensor receiving a portion of said light entering said optical chamber and producing a corresponding signal; and
   a microcontroller operationally connected to said optical sensor.

2. The optical device of claim 1, wherein a size of said groove in said front portion is related to a size of said area of said object such that a desired signal to noise ratio is attained.

3. The optical device of claim 1, further comprising a thin transparent element interposed between said front portion and said optical sensor.

4. The optical device of claim 1, comprising a plurality of optical sensors disposed in said optical chamber.

5. The optical device of claim 1, further comprising an analog/digital converter coupled to said optical sensor and coupled to said microcontroller, wherein said microcontroller samples a signal output by said converter at periodic intervals when said object moves relative to said front portion, said microcontroller plotting a response versus time curve on a display device.

6. The optical device of claim 5, wherein said periodic interval is two microseconds.

7. The optical device of claim 1, further comprising a signal amplification control device coupled to said optical sensor and coupled to said microcontroller, said signal amplification control device compensating for changes in lighting and changes in optical sensors.

8. The optical device of claim 5, further comprising a software program, said microcontroller calculating an integral of said response versus time curve.

9. The optical device of claim 8, wherein said integral is compared by said microcontroller with a standard measurement stored in a memory to determine a signal amplification adjustment.

10. The optical device of claim 8, further comprising subtraction circuit means for changing a direct current component of a signal derived from said corresponding signal.

11. The optical device of claim 8, said microcontroller comparing a plurality of integrals of plurality of response versus time curves of a corresponding plurality of objects, said microcontroller computing a maximum integral and a minimum integral of said plurality of response versus time curves.

12. The optical device of claim 1, comprising a plurality of optical sensors mounted inside said optical chamber, each of said optical sensors receiving a different portion of said reflected light.

13. The optical device of claim 5, wherein said microcontroller determines a speed of said object from an amount of time required for passage of said object past said groove in said front portion.

14. The optical device of claim 5, comprising two sensors mounted inside said optical chamber at a predetermined distance from each other, each of said sensors generating a different corresponding signal, wherein said microcontroller determines a speed of said object using said predetermined distance and using said corresponding signals.

15. The optical device of claim 1, further comprising an optical filter interposed between said front portion and said optical sensor, wherein said optical filter permits passage of light of a wavelength corresponding to a predetermined color.

16. The optical device of claim 1, comprising a plurality of optical filters, each of said plurality of optical filters permitting passage of light of a different wavelength.

17. The optical device of claim 5, wherein said microcontroller compares said corresponding signal with a profile signal stored in a memory.

18. The optical device of claim 1, further comprising:
   a filter circuit coupled to said optical sensor and coupled to said microcontroller, said filter circuit filtering signals with frequency above 2 KHz;
   an analog to digital converter coupled to said filter circuit and coupled to said microcontroller; and
   a signal amplification control device coupled to said analog to digital converter and coupled to said microcontroller.

19. The optical device of claim 1, comprising a plurality of microcontrollers, wherein at least one of said microcontrollers is connected to a memory external to said microcontroller.

20. An optical device for collecting data relating to a moving object, comprising:
   a housing forming an optical chamber, said housing having a front portion, said front portion having a ring-shaped groove, said front portion using an edge of said ring-shaped groove to restrict and regulate light entering said optical chamber, said light being reflected from an area of said moving object;
   four optical sensors mounted symmetrically inside said optical chamber such that each of said optical sensors receives a different portion of said light reflected from said moving object and entering said optical chamber; and a microcontroller operationally connected to each of said optical sensors.

21. The apparatus of claim 20, further comprising a keyboard and a display, said keyboard and said display being operationally connected to said microcontroller.

22. A method for collecting data relating to a moving object, comprising:

illuminating said moving object using an artificial light source adjacent said moving object;

restricting and regulating light reflected from said moving object using a front portion of a housing having a ring-shaped groove so that a portion of said reflected light is incident upon an optical sensor;

sampling a signal output by said optical sensor at periodic intervals; and displaying a response versus time curve derived from said signal on a display device.

* * * * *